June 19, 1945.  I. C. GARDNER  2,378,401
OPTICAL INSTRUMENT AND METHOD OF MAKING SAME
Filed May 13, 1942  3 Sheets-Sheet 1
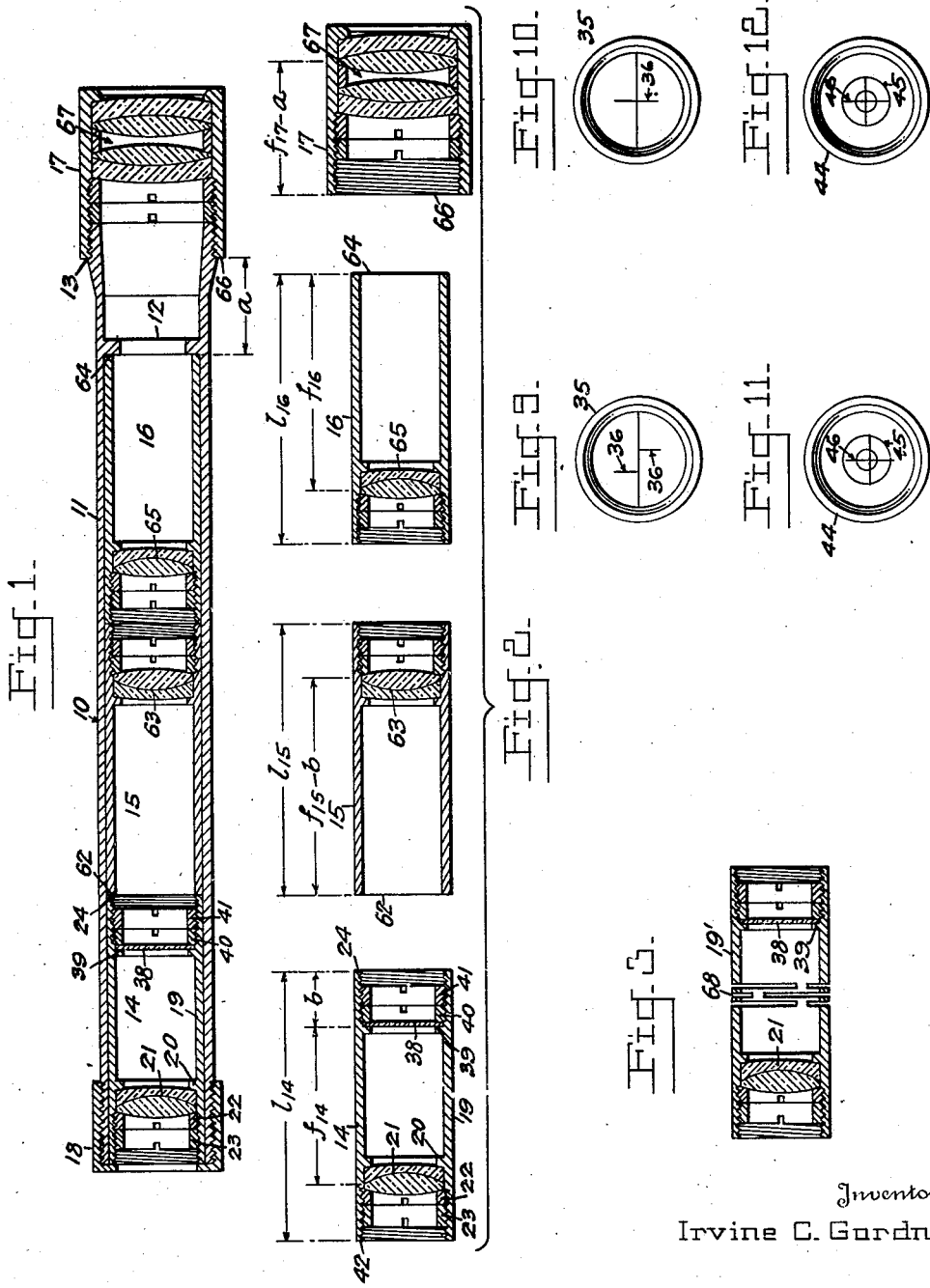
Inventor
Irvine C. Gardner

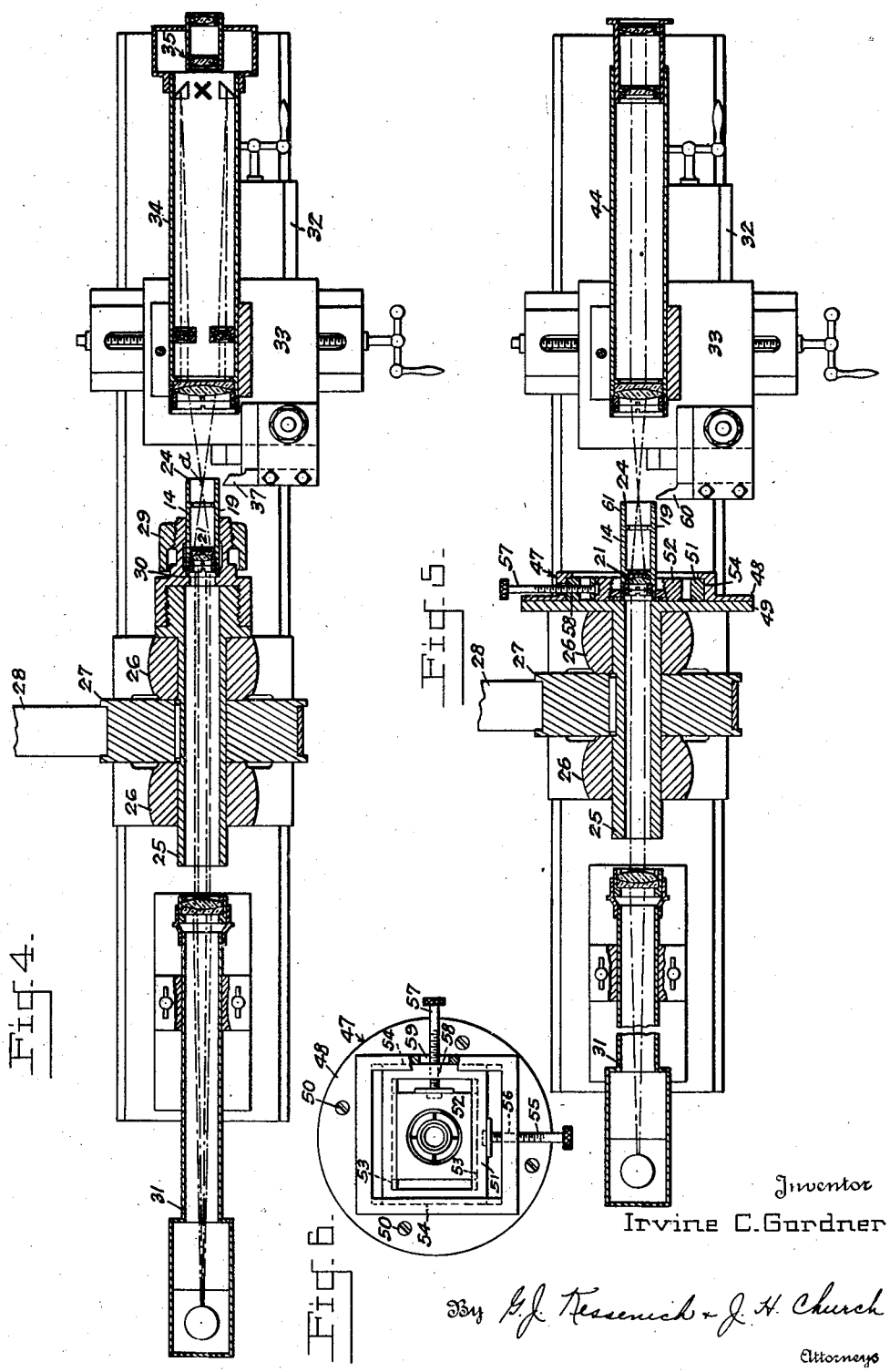

June 19, 1945.   I. C. GARDNER   2,378,401
OPTICAL INSTRUMENT AND METHOD OF MAKING SAME
Filed May 13, 1942   3 Sheets-Sheet 3
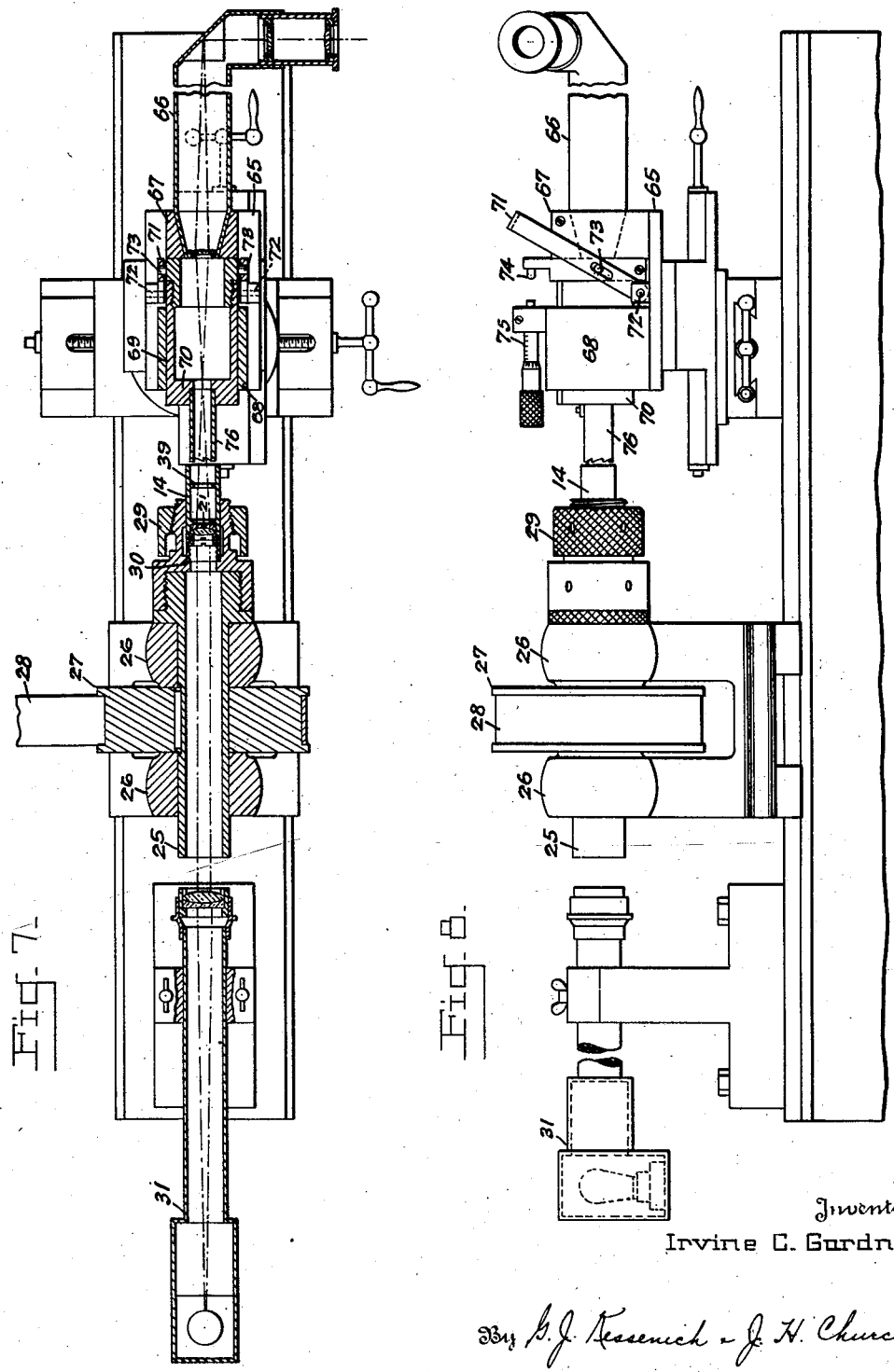
Inventor
Irvine C. Gardner
By G. J. Kessenich & J. H. Church
Attorneys Patented June 19, 1945

2,378,401

UNITED STATES PATENT OFFICE 2,378,401

OPTICAL INSTRUMENT AND METHOD OF MAKING SAME

Irvine C. Gardner, Chevy Chase, Md.

Application May 13, 1942, Serial No. 442,796

7 Claims. (Cl. 82—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a method of producing optical instruments by making the units thereof interchangeable with other similar units whereby production may be materially facilitated by obviating the necessity of the painstaking and time consuming adjustment of such units, after assembly as is required by present methods.

It is a principal object of the invention to provide a semi-automatic method of producing optical units that will be interchangeable with other similar units for the purpose of assembling such units into an optical instrument.

According to present production methods employed in the manufacture of optical instruments the optical units or components are not interchangeable and final assembly of the components into the optical instrument is an exacting procedure requiring assembly by selection and by the individual adjustment of parts through means of interthreaded connections, shims, etc. It is understood of course that optical tests are the most exacting known and readily available to the manufacturer with the result that it is quite possible to make lenses or prisms which will be more nearly identical than are nominally identical mechanical parts. An example of one such test is the interference test by which the curved surfaces of lenses are controlled, a test that will consistently detect a variation of 0.000005 inch or less; however, to control all the dimensions of a lens with corresponding precision would unnecessarily increase the cost of the individual lenses and it is therefore customary to permit much greater departures from uniformity. The variations arising from these departures from uniformity are compensated for by present methods through selective assembly and individual adjustment as above alluded to. This procedure can be followed without any significant prejudicial effect upon the performance of the instrument but it is a very slow expensive process and must be done by highly skilled technicians.

The method proposed by my present invention does not contemplate the production of lenses that are interchangeable but provides for the production of units which will be interchangeable. Each unit consists of one or more lenses permanently mounted in a cell and the cell is then so machined by a semi-automatic method that it will have locating surfaces so positioned thereon as to render it interchangeable with any other similar cell in an optical instrument assembled from cells similarly manufactured. As hereinbefore indicated the tolerances for the adjustment of the optical components of an optical instrument, while small, are not zero and, for optical instruments of the simpler type, it is possible by means of proper tooling in accordance with my method to assemble such instruments from interchangeable units by a method suggestive of the assembly line method found in automobile assembly plants.

The specific nature of the invention as well as other objects and advantages thereof will clearly appear from a description of a preferred embodiment as shown in the accompanying drawings in which:

Fig. 1 is a longitudinal sectional view of a telescopic sight made in accordance with my invention and shows how the method of my invention may be applied to optical instruments in general;

Fig. 2 is an exploded longitudinal sectional view of the optical units comprising the telescope of Fig. 1;

Fig. 3 is a longitudinal sectional view of a modified form of the objective shown in Fig. 2, but is exemplary of an expedient applicable to any suitable optical unit;

Fig. 4 is a sectional view of apparatus adapted for use in my process for the purpose of cutting the optical cells or units to proper length;

Fig. 5 is a sectional view of apparatus suitable for use in centering the lens and cell of an optical unit in accordance with the present invention;

Fig. 6 is an elevation of the chuck shown in Fig. 5 with portions shown in section to more clearly disclose the construction;

Fig. 7 is a sectional view of apparatus adapted for use in this invention to counterbore the objective cell of an objective unit for the purpose of forming a seat for receiving and properly positioning a reticle;

Fig. 8 is an elevational view of the structure shown in Fig. 7;

Figs. 9, 10, 11 and 12 are views showing eyepiece images as seen in the instruments used with the apparatus shown in Figs. 4 and 5, respectively, for different positions of adjustment of the instruments.

Referring now to the drawings there is shown in Fig. 1 a telescopic instrument 10 which merely discloses by way of example how one well known type of optical instrument may be manufactured in accordance with my invention. It will be understood, however, that the method hereinafter disclosed is not limited to the manufacture of the precise instrument shown in Fig. 1, but may be applied to any suitable type of optical instrument; consequently, subsequent description of the method of manufacture relative to the instrument shown is simply by way of convenience and not of limitation.

The particular telescope 10 shown in Fig. 1 lends itself to a comprehensive description of my manufacturing method and comprises a body tube 11 provided adjacent one end portion with an internal positioning seat or flange and field diaphragm 12 and external seat or flange 13 spaced a distance $a$ toward the adjacent end of the tube therefrom. As clearly indicated in Figs. 1 and 2 the optical system of the telescope is comprised of the objective unit 14, erector units 15 and 16 and eyepiece unit 17. The objective and erector units are properly positioned within the body tube 11 in serially abutting relation to each other and to the seat 12 wherein they are so secured by the clamping ring 18 while the eyepiece unit is so arranged and dimensioned as to be properly located upon the tube 11 when its forwardmost edge is disposed in abutting relation to the seat 13.

The units 14, 15, 16 and 17 are generally of similar construction and may be manufactured in a generally similar manner. In producing the objective unit 14 a metal cell 19 having an overall length greater than the final length $l_{14}$ shown in Fig. 2 is formed with a lens supporting flange or seat 20 adjacent one end arranged to receive an objective lens 21 which is firmly locked in position upon the seat by the retaining ring 22 and lock ring 23.

The objective unit thus far formed is next processed to have the end 24 of its cell cut off or faced in a plane spaced from the lens equal to the distance $f_{14}+b$ within a permissible tolerance, which in this type of instrument is usually taken to be 0.002 inch or less. The operation of facing the end 24 of the cell 19 may be performed in any suitable manner but is preferably done in a semi-automatic manner as by the use of apparatus as shown in Fig. 4. This apparatus comprises a hollow spindle 25 mounted for rotation in spaced bearings 26 and is adapted to be rotatably driven through any suitable means, such as by the pulley 27 and driven belt 28. A collet chuck or similar centering means 29 preferably provided with an annular seat 30 is affixed upon the right hand end of the spindle as viewed in Fig. 4 and a collimator 31 is mounted upon the bed of the apparatus in such manner as to direct a beam of parallel light through the hollow spindle from its end remote from the chuck in parallel axial relation. A base carriage 32 is mounted upon the bed of the apparatus for axially parallel movement of the hollow spindle and mounted upon this base carriage 32 is a second or cross feed carriage 33 arranged for movement transversely of the base carriage movement. A suitable instrument is mounted upon the carriage 33 with its optical axis arranged in parallelism with the prolongation of the axes of collimator 31 and hollow spindle 25 whereby the instrument may have its axis arranged to coincide with the axes of the collimator and hollow spindle through movement of the carriage 33. While this instrument, which is indicated at 34, may be a simple right angle microscope as indicated in Fig. 7 at 66, I prefer in this particular apparatus to employ a rangefinder of very short base or microscope provided with an ocular 35 that presents a divided field. With such an instrument a vertical line 36 imaged by the collimator will appear as laterally separated vertical segments as seen in Fig. 9 except when the instrument is correctly focused, at which time, the line will appear unbroken as seen in Fig. 10. Although the precision demanded does not require an instrument of the type indicated at 34 its use will render judgment of focus less difficult and permit operation of the machine by operators of comparatively less experience than would normally be required. A parting or cutting off tool 37 is detachably secured to the cross feed carriage 33 in such manner as to cut off an element retained by the chuck 29 at right angles to the axis of the spindle. For any particular optical unit being processed the tool 37 is fixed in invariant longitudinally spaced relation to the instrument 34 as clearly shown in Fig. 4. By reference to Fig. 2 it will be seen that the tool 37 will be arranged to cut off the cell 19 of objective unit 14 at a distance from the objective lens 21 equal to the focal length $f_{14}$ + the distance $b$, the latter distance being provided for mounting reticule 38, which is retained against its seat 39 in the focal plane of lens 21 by the retaining ring 40 and locking ring 41.

With apparatus of the character just described the objective unit 14 will be mounted in the centering chuck 29 with its reticule end portion outermost. In this position and after the source of light for the collimator has been energized the objective lens 21 will image the collimator mark in its focal or image plane at $d$ a distance $f_{14}$ away. The carriage 32 is next moved until the collimator mark as imaged by the objective lens is in focus in the instrument 34, which in the case of a vertical line will have the appearance of the line 36 indicated in Fig. 10. In the case of the objective unit the cutting off tool 37 is invariantly arranged relative to the instrument 34 in such manner that when the mark imaged by the objective unit is in focus in the instrument 34 that the tool 37 will cut off and face the cell 19 at its end 24 a distance $f_{14}+b$ from lens 21 as indicated in Fig. 2. After the mark imaged by the objective lens is focused in the instrument 34 the hollow spindle 25 is rotated to rotate the objective unit 14 and the parting tool 37 is advanced by the cross feed carriage 33 to properly cut off and face the end 24 of the cell 19. It is, of course, understood that movement between the unit 14 and tool 37 need only be relative and that hence the tool may be rotated and the unit 14 held stationary or that the tool and unit may both be rotated at differential speeds. In Fig. 4 the chuck 29 is shown as being provided with an annular seat or stop 30 upon which the optical unit 14 is bottomed for location in the chuck; however, this is but for convenience since an inaccurate setting against the stop does not introduce any error due to the fact that light incident upon lens 21 from the collimator 31 is parallel and as a result displacement of the objective unit 14 from the stop 30 will not change the fixed relative positions between the image and lens coil 19. This lack of dependence upon location of the objective unit 14 in the chuck 29 is of considerable advantage in that it increases the uniformity with which the elements may be machined. In proceeding with the processing of the objective unit in accordance with the last described process step it will be observed that with proper positioning of the tool 37 upon the carriage 33 and the service of an experienced mechanic to sharpen and adjust the tool from time to time that the apparatus may be operated by an operator relatively unskilled in the optical field.

After the end 24 of the objective unit 14 has ben cut off and faced as above described the overall length $l_{14}$ of the cell 19 is adjusted to proper value by cutting off the end 42 thereof. The latter cutting off operation of the cell 19 may be controlled by any of the usual mechanical methods for controlling the length of a specimen. In regard to cutting off the end 42 of cell 19 it may be noted that a tolerance of ±0.01 inch will usually be permissible whereas in locating the end 24 a tolerance of only ±0.002 inch or less was permissible. The greater tolerance in the case of cutting the end 42 of cell 19 for controlling the overall length $l_{14}$ of the cell is permissible because the rays of light to the left of lens 21 as viewed in Fig. 2 are parallel from an object at infinity and a variation in the spacing between this lens and the ones succeeding it has a negligible effect upon the optical performance of the instrument; therefore, the tolerance is determined by mechanical rather than optical considerations.

The objective unit 14 after having been thus far processed is next processed by a turning operation to have the external surface of cell 19 centered or provided with centered locating surfaces arranged concentric to the axis of lens 21. For this purpose I employ apparatus (Figs. 5 and 6) very similar to the apparatus shown in Fig. 4 with the exception of the chuck and microscope. In this case a simple microscope 44 is employed which is provided with a reticule that images a series of concentric circles as indicated at 45 in Figs. 11 and 12 and the collimator 31 images a cross as indicated at 46 in these two figures. The chuck generally indicated at 47 (Figs. 5 and 6) comprises a face plate 48 by which it may be attached to the hollow spindle 25 through the flange 49 on the spindle and bolts 50. Two slides 51 and 52 are mounted in ways 53 and 54 for relative right angular movement with respect to each other. The ways 54 which are shown disposed in a vertical position in Fig. 6, are formed in or attached to the face plate 48 while the ways 53 are formed in the slide block 51. The slide block 51 is movable in the ways 54 by a slow motion screw 55 threaded in the face plate as shown at 56 while the slide block 52 is movable in the ways 53 by a slow motion screw 57 threaded into the slide block 51 as indicated at 58. A slot 59 is formed in the face plate 48 to provide for relative movement of screw 57 by reason of movement of slide blocks 51 and 52 with respect to the face plate. An element such as the objective unit 14 may be secured in the chuck by means of any suitable conventional means and it will be understood that other suitable motions may be used for the slow motion screws shown.

In the operation of this apparatus in the step of making the seating shoulders or exterior surface of cell 19 of the objective unit 14 concentric with the axis of the lens, the unit is secured in the chuck 47 and the source of light for the collimator energized with the result that an observer using the instrument 44 will see the concentric circles 45 of the instrument and cross 46 of the collimator imaged in superposed relation in the manner indicated in Fig. 11 or 12.

If the marks image as indicated in Fig. 11 the objective unit is not centered and adjustment thereof will be made by means of the slow motion screws 55 and 57 until the lens 21 causes the collimator cross to stay on the circles 45 of instrument 44 in the manner indicated in Fig. 12 for all positions of rotation of the unit. Since the axis of the instrument 44 lies in the prolongation of the axis of the spindle 25 it will be evident that the axis of the lens is centered with respect thereto when the condition of the marks obtains as viewed in Fig. 12 during rotation of the spindle 25 and unit 14. As soon as the unit 14 is thus centered in the apparatus it will be rotated by rotating the spindle 25, and the turning tool 60 will be advanced by the axial and cross feed carriages 32 and 33, respectively, to turn positioning or location seats 61 on the exterior of the cell 19 concentric with the axis of lens 21. Seats 61 may be turned on one or both ends of the cell 19 or the entire exterior surface of the cell may be turned concentric as preferred or found necessary.

The detailed explanation of the method hereinabove set forth with respect to the objective unit is also applicable step by step with respect to the erector units 15 and 16 and eyepiece unit 17 with slight variation. In the case of erector unit 15 the end 62 thereof is cut off and faced in the same manner as the end 24 of unit 14; however, in this case the end 62 is cut off a distance from the lens 63 equal to its focal length $f_{15}$ minus the distance $b$ whereby the distance between the lenses 21 and 63 in the assembled telescope will be equal to the sum of the focal lengths $f_{14}$ and $f_{15}$, plus or minus the permissible tolerances. The lengths $l_{15}$ and $l_{16}$ may be controlled by the same mechanical methods employed to control length $l_{14}$.

Erector unit 16 has its end 64 cut off a distance $f_{16}$, equal to the focal length of lens 65, from the lens 65 and the eyepiece unit 17 has its end 66 cut off a distance from the lens 67 equal to the focal length $f_{17}$ of the lens minus the distance $a$ in order that when the eyepiece unit is secured upon the body tube 11 against seat 13 spaced a distance $a$ from the focal plane of erector unit 16 that the distance between lenses 65 and 67 will be equal to the sum of their focal lengths $f_{16}$ and $f_{17}$.

In Figs. 7 and 8 I have shown apparatus suitable for performing the final processing step on the objective unit 14, namely, the step of locating the seat 39 for the reticule 38. This apparatus is similar to the apparatus of Figs. 4 and 5, but is provided with a modified axial feed carriage 65 and simple right angle microscope 66 fixed thereon in axial prolongation of the apparatus by means of the support 67. A second support 68 provided with a bore 69 is rigidly mounted on the carriage 65 in spaced relation to the support 67 with its bore in axial prolongation of the apparatus. Slidably mounted in the bore 69 of the support 68 is a hollow tool holder 70 which may be longitudinally moved to and fro in the bore 69 by means of a U-shaped stirrup 71 which is pivoted to the carriage at 72 and attached to the tool holder by pin and slot or similar connections indicated at 73. The movement of the tool holder may be limited to any value within its range of movement by a stop 74 affixed to the tool holder and a cooperating micrometer stop 75 affixed to the support 68. A hollow counterboring tool 76 is retained in the tool holder 70 by any conventional means employed for such purpose.

In the use of this apparatus the objective unit 14 is affixed in the chuck 29 and light from the collimator 31 is caused to pass through the hollow spindle 25 and objective unit lens 21 imaging the collimator mark in the focal or proper image plane of the lens. The carriage 65 will be moved until the microscope 66 is in focus on the collimator mark image by the objective unit lens with the tool holder 70 and tool 76 in their retracted positions. The stops 74, 75 will be adjusted to the depth of counterbore to be made, which in the case of objective unit 14 will be equal to the distance b shown in Fig. 2, it being clear that the distance between the stops 74, 75 in their completely separated position and with the microscope 66 in focus on the mark imaged by the objective unit is a measure of the distance of the face of tool 76 from the focal plane of lens 21 of the objective unit. When the instrument 66 is in focus as described with the stops 74, 75 completely separated the unit 14 is rotated by the spindle 25 and chuck 29 and tool 76 is advanced by the stirrup 71 and tool holder 70 to counterbore the adjacent end of cell 19 to form the seat 39 against which the reticule 38 is retained by the retaining ring 40 and locking ring 41.

By the method hereinabove described for forming the optical units all errors in the lenses have been compensated for by the manner in which the units have had the locating surfaces formed thereon and hence they are interchangeable in assembling which very materially facilitates production and maintenance.

The complete array of units composing the telescope are shown in Fig. 2. The body of the telescope is a straight tube 11, wherein the interior positioning seat 12 also serves as a field diaphragm. The units 14, 15, and 16 are inserted in tube 11 from its objective end in the order shown in Fig. 1 and crowded against each other and the seat 12 by the clamping ring or cap 18. The dimension marked a is measured between the two locating surfaces, the plane of the field diaphragm 12 and the shoulder or seat 13 against which the eyepiece unit 17 seats. This length can be determined by a mechanical control method and the usual tolerance permissible in this type of control will restrict the focal adjustment of the eyepiece within a range from 0 to ±0.5 diopter, this being the tolerance provided for in the usual specifications for this particular type of instrument.

It may be observed that the method of assembly herein proposed also permits extremely liberal allowance of tolerances in the construction of lenses. The two optical considerations that govern limitations on tolerances in the construction of lenses are (a) aberration requirements, and (b) the focal length requirement. If the surfaces of the lens are controlled by conventional test plate methods, the index of refraction may vary as much as 0.0015 without seriously affecting the balancing of the aberrations. The usual specifications permit a variation of from 1 to 1.15 of the magnification. When this tolerance is distributed among all the optical components of the system there is still a liberal tolerance left for each lens, consequently my method of assembling the instrument from interchangeable units does not prohibit extremely liberal tolerances for the lenses but on the contrary makes such tolerances permissible, which is advantageous because it permits the more effective use of available glass and favors the economic production of lenses.

Thus far in the practice of my invention I have not encountered any difficulty in permissible tolerances governing parallax; however, if the seat 39 is not accurately located it might be difficult to eliminate this error with units constructed as in Fig. 2 so in order to make provision for an adjustment for parallax I may form the objective unit as in Fig. 3. In this form of objective unit the cell 19' is sawed to follow any suitable pattern as indicated at 68 which in effect makes the cell a stiff spring which will yield when pressure is applied. The shoulder or seat 39 in this case is formed slightly to the right of the focal plane of lens 21 so that after the parts are assembled in the tube 11 the cell 19' can be compressed by the clamping cap 18 to accurately position the reticule 38 in the focal plane of lens 21 and completely eliminate parallax within permissible tolerances of the instrument.

While this invention has been described in detail with respect to a specific instrument such procedure has been followed only as a matter of convenience as it will be apparent to all of those skilled in this art that a similar procedure may be followed in manufacturing various optical instruments and, therefore, I do not limit my invention except as follows.

I claim:

1. Method for manufacturing a cell which includes a converging lens, said method comprising introducing substantially parallel light rays into said lens in a direction substantially perpendicular to the focal plane of said lens; establishing, by operating upon the light rays which have passed through said lens, a finite point of reference from which the position of the focal plane of said lens can be reckoned; reckoning the position of a tool, for operating on said cell, from said point of reference; locating a cutting tool at said position, and relatively moving the said cutting tool and said cell to effect cutting of the latter.

2. Method for manufacturing a cell which includes a converging lens, said method comprising introducing substantially parallel light rays into said lens in a direction substantially perpendicular to the focal plane of said lens; adjustably mounting said cell for rotation about the principal axis of said lens; operating upon the light rays which pass through said lens to test the alignment of the principal axis of said lens and the axis of rotation of said cell; adjusting the position of the cell until the principal axis of said lens and the axis of rotation of the cell are in the same straight line; rotating said cell about the principal axis of said lens, and during said rotation applying a cutting tool to the said cell, whereby the resulting cut surface is concentric with the principal axis of said lens.

3. Method for manufacturing a cell containing a converging lens, the said method comprising passing parallel light rays through said converging lens, passing said rays after passage through said converging lens to a viewing instrument to be focussed by said instrument, focussing said instrument, reckoning the position of a tool for operating on said cell from the position of said viewing instrument when in focus, locating a cutting tool at said position, and moving said cell and tool relatively to cause the said tool to operate upon the cell.

4. Apparatus for manufacturing a cell containing a converging lens, said apparatus comprising means for producing parallel light rays from light rays proceeding from a light source, means for mounting said cell in the path of said parallel light rays so that said light rays pass through said converging lens; optical means, utilizing the light rays passing through said converging lens, for establishing a reckoning position exteriorly of said cell from which the focal plane of said converging lens can be reckoned; a cutting tool for the material of said cell located in a position reckoned from said established reckoning position, and means for producing relative motion between said cell and said cutting means for operating upon the material of said cell.

5. Apparatus for manufacturing a cell containing a converging lens, said apparatus comprising means for producing parallel light rays from light rays proceeding from a light source, means for mounting said cell in the path of said parallel light rays so that said light rays pass through said converging lens; optical means, utilizing the light rays passing through said converging lens, for establishing a reckoning position exteriorly of said cell from which the focal plane of said converging lens can be reckoned; means for rotating said cell about an axis substantially perpendicular to the focal plane of said converging lens, a lathe tool mounted for operating on said cell and located in a position reckoned from said established reckoning position, and means for relatively moving the said cell and said lathe tool towards and away from each other during the rotation of said cell.

6. Apparatus for manufacturing a cell containing a converging lens, said apparatus comprising means for producing parallel light rays from light rays proceeding from a source of light, means for mounting said cell in the path of said parallel light rays so that said light rays pass through said converging lens, means for rotating said cell about an axis substantially perpendicular to the focal plane of said converging lens, adjusting means for centering the principal axis of said converging lens with respect to the axis of rotation of the means for rotating said cell; optical means, utilizing the light rays passing through said converging lens, for establishing when the principal axis of said converging lens and the axis of rotation of the rotating means for the cell are concentric; a lathe tool for turning the exterior of said cell to render at least portions thereof concentric with the principal axis of said converging lens, and means for moving said tool and said cell relative to each other parallel to the principal axis of said converging lens.

7. Apparatus for manufacturing a cell containing a converging lens, said apparatus comprising means for producing parallel light rays from light rays proceeding from a source of light, means for mounting said cell in the path of said parallel light rays so that said light rays pass through said converging lens, means for rotating said cell about an axis substantially perpendicular to the focal plane of said converging lens; optical means, utilizing the light rays passing through said converging lens, for establishing a reckoning position exteriorly of said cell from which the focal plane of said converging lens can be reckoned; a boring tool located in a position reckoned from said established reckoning position, and means to advance the boring tool into said cell parallel to the axis of said converging lens.

IRVINE C. GARDNER.